(12) United States Patent
Kim

(10) Patent No.: US 9,618,111 B2
(45) Date of Patent: Apr. 11, 2017

(54) APPARATUS FOR LEARN CONTROL OF AUTOMATIC TRANSMISSION AND METHOD THEREOF

(71) Applicant: Hyundai Motor Company, Seoul (KR)

(72) Inventor: Dong Kyun Kim, Gyeonggi-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 61 days.

(21) Appl. No.: 14/859,219

(22) Filed: Sep. 18, 2015

(65) Prior Publication Data

US 2016/0265655 A1 Sep. 15, 2016

(30) Foreign Application Priority Data

Mar. 13, 2015 (KR) .................. 10-2015-0035219

(51) Int. Cl.
*F16H 61/00* (2006.01)
*F16H 61/02* (2006.01)
*F16H 59/42* (2006.01)

(52) U.S. Cl.
CPC ..... *F16H 61/0021* (2013.01); *F16H 61/0202* (2013.01); *F16H 59/42* (2013.01); *F16H 2059/425* (2013.01); *F16H 2061/0087* (2013.01)

(58) Field of Classification Search
CPC ............... F16H 61/0202; F16H 2059/425
See application file for complete search history.

(56) References Cited

U.S. PATENT DOCUMENTS 6,510,371 B1 * 1/2003 Lee .................. F16H 61/08
192/3.55
7,833,128 B2 * 11/2010 Nakamura .......... F16H 61/061
477/127
9,157,525 B2 10/2015 Inoue et al.
9,233,684 B2 * 1/2016 Park .................. F16H 61/061
2005/0092073 A1 5/2005 Jeon
2014/0067174 A1 3/2014 Park

FOREIGN PATENT DOCUMENTS

| JP | 0886351 | 4/1996 |
|----|---------|--------|
| JP | H10-299880 A | 11/1998 |
| KR | 10-2002-0046740 A | 6/2002 |
| KR | 100527498 | 11/2005 |
| KR | 100828446 | 5/2008 |
| KR | 101071057 | 10/2011 |
| KR | 1020110116584 | 10/2011 |
| KR | 101371461 | 3/2014 |
| WO | WO2013/145970 A1 | 10/2013 |

* cited by examiner

*Primary Examiner* — Jacob S Scott
*Assistant Examiner* — Tinh Dang
(74) *Attorney, Agent, or Firm* — Brinks Gilson & Lione

(57) ABSTRACT

An apparatus for a learn control of an automatic transmission includes a storage unit configured to store an initial fill time value and a gain value corresponding to a revolution per minute (RPM) peak to peak of a turbine. An oil pressure applier is configured to apply an oil pressure to a non-operating friction element. An RPM measurer is configured to measure the RPM of the turbine, and a learn controller is configured to control the oil pressure applier to apply the oil pressure to the non-operating friction element during a preset reference time and control the initial fill time based on the RPM peak to peak of the turbine showing a difference between a measured value RPM of the turbine measured by the RPM measurer and a preset targeted value while a vehicle is in a coasting operation in an in gear state.

10 Claims, 3 Drawing Sheets

APPARATUS FOR LEARN CONTROL OF AUTOMATIC TRANSMISSION AND METHOD THEREOF

CROSS-REFERENCE TO RELATED APPLICATIONS

This application is based on and claims the benefit of priority to Korean Patent Application No. 10-2015-0035219, filed on Mar. 13, 2015, which is hereby incorporated by reference in its entirety.

FIELD

The present disclosure relates to an apparatus for a learn control of an automatic transmission and a method thereof.

BACKGROUND

The statements in this section merely provide background information related to the present disclosure and may not constitute prior art.

An example of friction elements affecting a fill time in an automatic transmission for a vehicle may include a clutch, a brake, etc. Each of the friction elements may be operated or may not be operated at a specific shift stage. Here, the fill time means a torque preparation time for transmission.

For example, when the shift stage is a 6 stage, the operating friction element includes an over drive clutch and a 2 and 6 stage brake and the non-operating friction element includes an under drive clutch.

The existing method for a learn control of an automatic transmission learns the fill time in consideration of the operating friction element at the time of the transmission.

That is, the existing method for a learn control of an automatic transmission applies an oil pressure to the clutch operated as the friction element at the time of the transmission and performs the fill time learn by reflecting a time corresponding to a difference between a measured value and a targeted value of a turbine RPM to an initial fill time when the clutch is combined with the gear by the applied oil pressure.

The existing method for a learn control of an automatic transmission may perform the fill time learn only at the time of the transmission depending on acceleration within a specific condition, that is, a stable turbine torque range, and therefore does not perform the fill time learn under various operation conditions, in particular, the coasting operation condition in the in gear state.

Therefore, the time required for the fill time learn may not only be long, but other problems may also occur.

SUMMARY

An aspect of the present disclosure provides an apparatus for a learn control of an automatic transmission and a method thereof capable of learning a fill time even while a vehicle is in a coasting operation in an in gear state, by applying an oil pressure to a non-operating friction element during the coasting operation in the in gear state and learning the fill time using an interlock phenomenon of the automatic transmission occurring due to the applied oil pressure.

According to one form of the present disclosure, an apparatus for a learn control of an automatic transmission includes: a storage unit configured to store an initial fill time value and a gain value corresponding to a revolution per minute (RPM) peak to peak of a turbine; an oil pressure applier configured to apply an oil pressure to a non-operating friction element; an RPM measurer configured to measure the RPM of the turbine; and a learn controller configured to control the oil pressure applier to apply the oil pressure to the non-operating friction element during a preset reference time and control the initial fill time based on the RPM peak to peak of the turbine representing a difference between the RPM (hereinafter, measured value) of the turbine measured by the RPM measurer and a preset targeted value, while a vehicle is in a coasting operation in an in gear state.

According to another form of the present disclosure, an apparatus for a learn control of an automatic transmission includes: a storage unit configured to store an initial fill time value and a gain value corresponding to a revolution per minute (RPM) peak to peak of a drive shaft; an oil pressure applier configured to apply an oil pressure to a non-operating friction element; an RPM measurer configured to measure the RPM of the drive shaft; and a learn controller configured to control the oil pressure applier to apply the oil pressure to the non-operating friction element during a preset reference time and control the initial fill time based on the RPM peak to peak of the drive shaft showing a difference between the RPM (hereinafter, measured value) of the drive shaft measured by the RPM measurer and a preset targeted value, while a vehicle is in a coasting operation in an in gear state.

According to still another form of the present disclosure, a method for a learn control of an automatic transmission includes: controlling, by a learn controller, an oil pressure applier to apply an oil pressure to a non-operating friction element for a preset reference time when a vehicle is in a coasting operation in an in gear state; calculating, by the learn controller, an RPM peak to peak of a turbine representing a difference between the RPM (hereinafter, measured value) of the turbine measured by an RPM measurer and a preset targeted value; confirming, by the learn controller, whether the calculated RPM peak to peak of the turbine satisfies a condition; compensating for an initial fill time based on a gain value corresponding to the RPM peak to peak of the turbine if the calculated RPM peak to peak of the turbine satisfies the condition as the confirmation result; and repeatedly performing the steps after the reference time is increased as much as a unit time if the calculated RPM peak to peak of the turbine does not satisfy the condition as the confirmation result.

According to still another form of the present disclosure, a method for a learn control of an automatic transmission includes: controlling, by a learn controller, an oil pressure applier to apply an oil pressure to a non-operating friction element for a preset reference time when a vehicle is in a coasting operation in an in gear state; calculating, by the learn controller, an RPM peak to peak of a drive shaft representing a difference between the RPM (hereinafter, measured value) of the drive shaft measured by an RPM measurer and a preset targeted value; confirming, by the learn controller, whether the calculated RPM peak to peak of the drive shaft satisfies a condition; compensating for an initial fill time based on a gain value corresponding to the RPM peak to peak of the drive shaft if the calculated RPM peak to peak of the drive shaft satisfies the condition as the confirmation result; and repeatedly performing the steps after the reference time is increased as much as a unit time if the calculated RPM peak to peak of the drive shaft does not satisfy the condition as the confirmation result.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
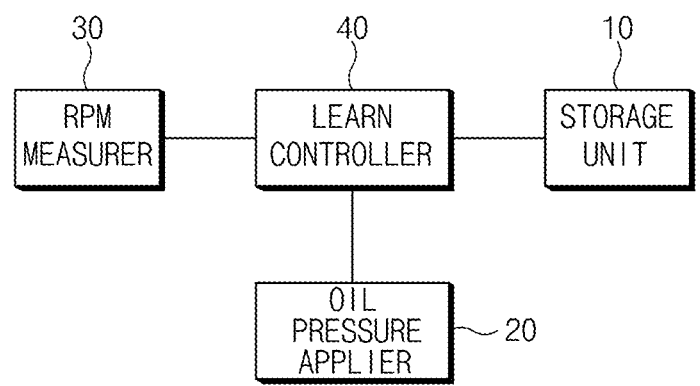
FIG. 1 is a configuration diagram of an apparatus for a learn control of an automatic transmission according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1 an apparatus for a learn control of an automatic transmission according to one form of the present disclosure is illustrated. As shown, the apparatus for a learn control of an automatic transmission includes a storage unit 10, an oil pressure applier 20, a revolution per minute (RPM) measurer 30, and a learn controller 40.

Reviewing each component, first, the storage unit 10 stores an initial fill time value and a gain value corresponding to an RPM peak to peak of a turbine. In this case, the fill time value is a torque preparation time for the transmission and affects a time to apply an oil pressure to a friction element.

Next, the oil pressure applier 20 applies an oil pressure to a non-operating friction element under the control of the learn controller 40. For example, when a targeted shift stage is a 6 stage, a first clutch and a brake become an operating friction element and a second clutch becomes a non-operating friction element.

Next, the RPM measurer 30 measures the RPM of the turbine within the automatic transmission under the control of the learn controller 40. The RPM measurer 30 may also measure an RPM of a drive shaft under the control of the learn controller 40.

Next, the learn controller 40 generally controls each component to normally perform its own function.

In particular, the learn controller 40 interlocks with a shift controller (not illustrated) to acquire various kinds of shift information. In this case, the shift information includes a current gear stage, a turbine torque, an accel position sensor (APS) value, or the like. Further, the learn controller 40 may also acquire various kinds of shift information through a vehicle network. In this case, the vehicle network includes a controller area network (CAN), a local interconnect network (LIN), a FlexRay, a media oriented system transport (MOST), and the like.

Further, the learn controller 40 confirms that a vehicle is in a coasting operation in an in gear state and then controls the oil pressure applier 20 to apply an oil pressure to the non-operating friction element for a preset reference time T. Here, the non-operating friction element means a friction element which is not operated under the coasting operation condition in the in gear state.

Next, it is confirmed whether an interlock phenomenon by the non-operating friction element, that is, a phenomenon that the RPM peak to peak of the turbine temporarily exceeds a threshold occurs. Here, the RPM peak to peak of the turbine means a value obtained by subtracting a preset targeted value from the RPM (measured value) of the turbine measured by the RPM measurer 30.

That is, the learn controller 40 confirms whether the RPM peak to peak of the turbine exceeds a first threshold α or is less than a second threshold β. Here, the α may be set to be a positive (+) value and the β may be set to be a negative (−) value.

To this end, the learn controller 4 monitors the RPM of the turbine which is measured by the RPM measurer 30.

Next, when the RPM peak to peak of the turbine exceeds the first threshold α or is less than the second threshold β, the learn controller 40 reflects a gain value δ corresponding to the RPM peak to peak to an initial fill time stored in the storage unit 10. Here, the gain value is a time value.

For example, the case in which the RPM peak to peak of the turbine exceeds the first threshold is a case in which the measured value exceeds the targeted value beyond an appropriate range. In this case, the gain value has a negative (−) value and thus a difference between the measured value and the targeted value is converged to an appropriate range. That is, the initial fill time is reduced.

On the other hand, the case in which the RPM peak to peak of the turbine is less than the second threshold is the case in which the measured value is smaller than the targeted value beyond an appropriate range. In this case, the gain value has a positive (+) value and thus the difference between the measured value and the targeted value is converged to an appropriate range. That is, the initial fill time is increased.

Meanwhile, when the RPM peak to peak of the turbine is equal to or less than the first threshold or is equal to or more than the second threshold value, the controller 40 increases the reference time as much as a unit time (for example, 10 msec) and then repeatedly performs the above process. In this case, a process of adding the unit time to the fill time is performed every period.

For example, when the reference time is T, at the time of performing the first process, T is used, at the time of performing the second process, the reference time is T+10, and at the time of performing the third process, the reference time is T+20.

When the above-mentioned processes are repeatedly performed a predetermined number of times (for example, about 10 times based on experimental results), the interlock phenomenon occurs in the automatic transmission, and therefore thus the possibility of an endless repetition is decrease.

Hereinafter, a relationship between the RPM peak to peak of the turbine and the gain value will be described in detail with reference to FIG. 2, which is a diagram of a graph showing a relationship between an RPM peak to peak of a turbine and a gain value.

Figure 2:
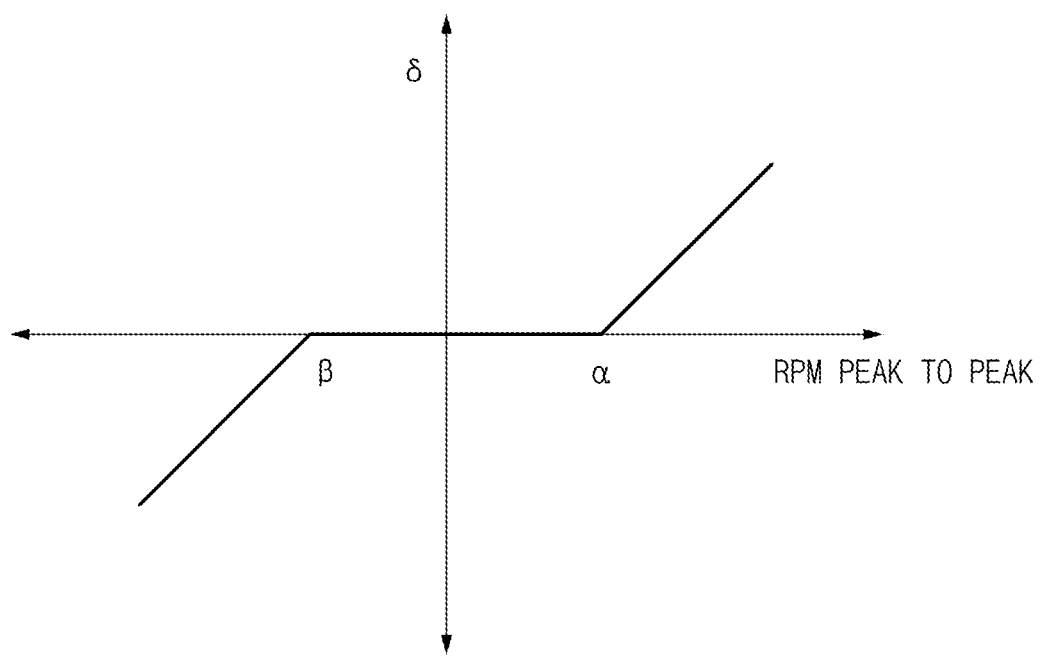
FIG. 2 is a diagram of a graph showing a relationship between an RPM peak to peak of a turbine and a gain value.

In FIG. 2, an x axis means the RPM peak to peak (=measured value−targeted value) of the turbine, a y axis means the gain value, α means the first threshold, and β means the second threshold. Here, the appropriate range represents the RPM peak to peak between β and α. For example, when the α value is 3 and the β value is −2, if the difference between the measured value and the targeted value of the RPM of the turbine is equal to or more than −2 or is equal to or less than 3, the initial fill time is not controlled. The graph may be stored in the storage unit 10.

Although the forms of the present disclosure describe the process of controlling the initial fill time based on the RPM peak to peak of the turbine, another form of the present disclosure may use the RPM peak to peak of the drive shaft to control the initial fill time by the same method as the foregoing method. In this case, FIG. 2 is replaced with the graph showing the relationship between the RPM peak to peak of the drive shaft and the gain value.

Figure 3:
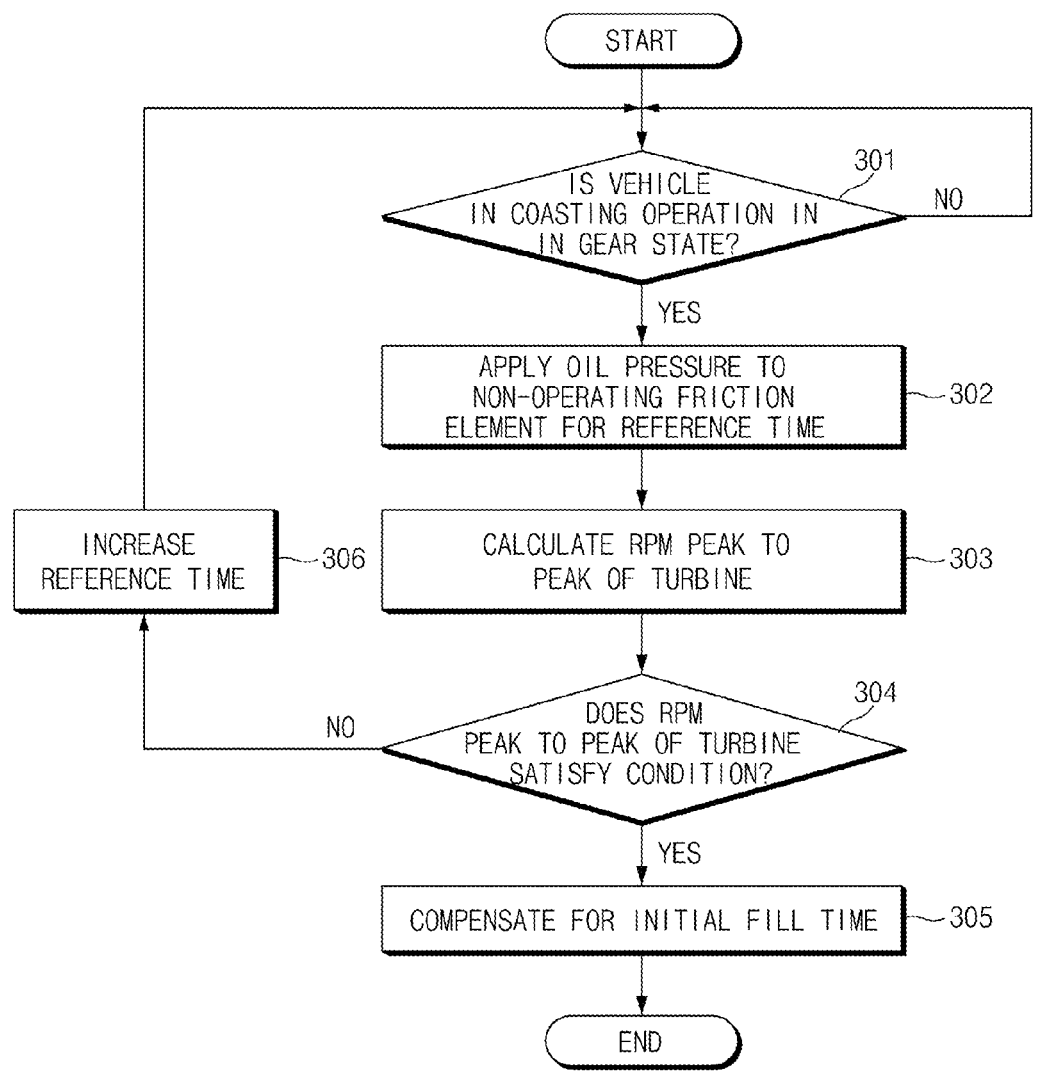
FIG. 3 is a flow chart of a method for a learn control of an automatic transmission according to one form of the present disclosure.

FIG. 3 is a flow chart of a method for a learn control of an automatic transmission according to another form of the present disclosure and illustrates the process performed by the learn controller 40.

First, when the vehicle is in the coasting operation in the in gear state (301), the oil pressure applier 20 is controlled to apply the oil pressure to the non-operating friction element for the preset reference time (302).

Next, the RPM peak to peak of the turbine representing the difference between the RPM (hereinafter, measured value) of the turbine measured by the RPM measurer 30 and the preset targeted value is calculated (303).

Next, it is confirmed whether the calculated RPM peak to peak of the turbine satisfies the condition, that is, the calculated RPM peak to peak of the turbine exceeds the first threshold α which is the positive (+) value or the second threshold β which is the negative (−) value (304).

As the confirmation result (304), if the calculated RPM peak to peak of the turbine satisfies the condition, the initial fill time is compensated based on the graph showing the gain value corresponding to the RPM peak to peak of the turbine (305).

As the confirmation result (304), if the calculated RPM peak to peak of the turbine does not satisfy the condition, the reference time is increased by the unit time (306) and then the method proceeds to the process "301".

As described above, according to the forms of the present disclosure, it is possible to implement the fill time learn even while the vehicle is in the coasting operation in the in gear state, by applying the oil pressure to the non-operating friction element during the coasting operation in the in gear state and learning the fill time using the interlock phenomenon of the automatic transmission occurring due to the applied oil pressure.

Meanwhile, the method according to forms of the present disclosure as described above may be prepared by a computer program. Further, the prepared program is stored in computer-readable recording media (information storage media} and is read and executed by a computer to implement the method according to the exemplary embodiment of the present disclosure. Further, the recording media may include any type of recording media which may be read by a computer.

The present disclosure described above may be variously substituted, altered, and modified by those skilled in the art to which the present disclosure pertains without departing from the scope and sprit of the present disclosure. Therefore, the present disclosure is not limited to the above-mentioned forms and the accompanying drawings.

What is claimed is:

1. An apparatus for a learn control of an automatic transmission, comprising:

a storage unit configured to store an initial fill time value and a gain value corresponding to a revolution per minute (RPM) peak to peak of a turbine;
an oil pressure applier configured to apply an oil pressure to a non-operating friction element;
an RPM measurer configured to determine a measured value RPM of the turbine;
and a learn controller configured to control the oil pressure applier to apply the oil pressure to the non-operating friction element during a preset reference time and control the initial fill time based on the RPM peak to peak of the turbine showing a difference between the measured value RPM of the turbine determined by the RPM measurer and a preset targeted value, while a vehicle is in a coasting operation in an in-gear state.

2. The apparatus according to claim 1, wherein the RPM peak to peak of the turbine is a value obtained by subtracting the targeted value from the measured value.

3. The apparatus according to claim 1, wherein the learn controller controls the initial fill time when the RPM peak to peak of the turbine exceeds a first threshold α which is a positive (+) value or is less than a second threshold β which is a negative (−) value.

4. The apparatus according to claim 3, wherein the learn controller reduces the initial fill time when the RPM peak to peak of the turbine exceeds the first threshold α.

5. The apparatus according to claim 3, wherein the learn controller increases the initial fill time when the RPM peak to peak of the turbine is less than the second threshold β.

6. The apparatus according to claim 1, wherein when the RPM peak to peak of the turbine is equal to or less than a first threshold α or is equal to or more than a second threshold β, the learn controller increases the reference time as much as a unit time and then controls the oil pressure applier to apply the oil pressure to the non-operating friction element for the increased reference time.

7. A method for a learn control of an automatic transmission, comprising:

controlling, by a learn controller, an oil pressure applier to apply an oil pressure to a non-operating friction element for a preset reference time when a vehicle is in a coasting operation in an in gear state;
calculating, by the learn controller, an RPM peak to peak of a turbine representing a difference between a measured value RPM of the turbine measured by an RPM measurer and a preset targeted value;
confirming, by the learn controller, whether the calculated RPM peak to peak of the turbine satisfies a condition;
compensating for an initial fill time based on a gain value corresponding to the RPM peak to peak of the turbine if the calculated RPM peak to peak of the turbine satisfies the condition as the confirmation result; and
repeatedly performing the steps after the reference time is increased as much as a unit time if the calculated RPM peak to peak of the turbine does not satisfy the condition as the confirmation result.

8. The method according to claim 7, wherein the RPM peak to peak of the turbine exceeds a first threshold α which is a positive (+) value or less than a second threshold β which is a negative (−) value.

9. The method according to claim 8, wherein in the compensating for the initial fill time, the initial fill time is reduced when the RPM peak to peak of the turbine exceeds the first threshold α.

10. The method according to claim 8, wherein in the compensating for the initial fill time, the initial fill time is increased when the RPM peak to peak of the turbine is less than the second threshold β.

* * * * *